US006022752A

United States Patent [19]

Hirsh et al.

[11] Patent Number: 6,022,752

[45] Date of Patent: Feb. 8, 2000

[54] MANDREL FOR FORMING A NOZZLE PLATE HAVING ORIFICES OF PRECISE SIZE AND LOCATION AND METHOD OF MAKING THE MANDREL

[75] Inventors: Jeffrey I. Hirsh; Xin Wen, both of Rochester, N.Y.

[73] Assignee: Eastman Kodak Company, Rochester, N.Y.

[21] Appl. No.: 09/215,526

[22] Filed: Dec. 18, 1998

[51] Int. Cl.[7] .......... G01D 15/20

[52] U.S. Cl. .......... 438/21; 216/27; 216/40; 216/45

[58] Field of Search .......... 216/27, 40, 45, 216/47, 51; 438/21; 204/11, 281

[56] References Cited

U.S. PATENT DOCUMENTS

| | | | |
|---|---|---|---|
| 4,773,971 | 9/1988 | Lam et al. | 204/11 |
| 5,053,105 | 10/1991 | Fox, III | 156/643 |
| 5,348,616 | 9/1994 | Hartman et al. | 156/643 |

*Primary Examiner*—Bruce Breneman
*Assistant Examiner*—Alva C. Powell
*Attorney, Agent, or Firm*—Walter S. Stevens

[57] ABSTRACT

A mandrel for forming a nozzle plate having orifices of precise size and location, and method of making the mandrel. The nozzle plate is formed by overcoating a substrate with a metal film. The film is covered with a photoresist material. Portions of the photoresist are exposed to light passing through a photomask having an annular light-transparent regions, of precise diameters and pitch. The photoresist is subjected to a developer bath which dissolves the photoresist exposed to the light, thereby revealing selected portion of the film. Next, an etchant is brought into contact with the film for etching-away the film so as to an annular opening in the film defining a column of precise diameter at the center of each opening. A new photoresist layer is then applied to the film. Portions of the new photoresist layer is exposed to light passing through a second photomask. The new photoresist material is then subjected to the developer which dissolves the new photoresist material to reveal the film beneath the photoresist and selected areas of the substrate. A second etchant is applied to create an annular recess extending into the substrate. The column resides at the center of the recess. This forms the nozzle plate mandrel. Next, a metal layer that will form the nozzle plate is deposited onto the film and grows into the recess to substantially fill the recess, except for the space occupied by the column. The finished nozzle plate is separated from the film/substrate structure to obtain orifices with precise diameters and pitch.

9 Claims, 10 Drawing Sheets

MANDREL FOR FORMING A NOZZLE PLATE HAVING ORIFICES OF PRECISE SIZE AND LOCATION AND METHOD OF MAKING THE MANDREL

BACKGROUND OF THE INVENTION

This invention generally relates to print head nozzle plates and methods and more particularly relates to a mandrel for forming an ink jet nozzle plate having orifices of precise size and location, and method of making the mandrel.

An ink jet printer produces images on a receiver by ejecting ink droplets onto the receiver in an imagewise fashion. The advantages of nonimpact, low-noise, low energy use, and low cost operation in addition to the capability of the printer to print on plain paper are largely responsible for the wide acceptance of ink jet printers in the marketplace.

In the case of “drop on demand” ink jet printers, a print head formed of piezoelectric material includes a plurality of ink channels, each channel containing ink therein. Each of these channels is defined by a pair of oppositely disposed sidewalls. Also, each of these channels terminates in a channel opening for exit of ink droplets onto a receiver disposed opposite the openings. The piezoelectric material possesses piezoelectric properties such that an electric field applied to a selected pair of sidewalls produces a mechanical stress in the sidewalls. Thus, the pair of sidewalls inwardly deform as the mechanical stress is produced by the applied electric field. As the pair of sidewalls defining the channel inwardly deform, an ink droplet is squeezed from the channel. Some naturally occurring materials possessing such piezoelectric characteristics are quartz and tourmaline. The most commonly produced piezoelectric ceramics are lead zirconate titanate (PZT), barium titanate, lead titanate, and lead metaniobate. However, it is desirable that the ink droplet exiting the channel opening travel in a predetermined trajectory so that the droplet has a predetermined velocity and volume and lands on the receiver at a predetermined location.

Therefore, it is customary to attach a nozzle plate to the print head such that the nozzle plate faces the receiver, so that the ink droplet achieves the desired volume and trajectory. The nozzle plate has nozzle orifices therethrough aligned with respective ones of the channel openings. The purpose of the orifices is to produce ink droplets having a predetermined volume and velocity. Another purpose of the orifices is to direct each ink droplet along a trajectory normal (i.e., at a right angle) to the nozzle plate and thus normal to the receiver surface. If diameter of the nozzle orifice deviates from a desired diameter, ink droplet trajectory, volume and velocity can vary from desired values. Moreover, deviation from desired values of trajectory, volume and velocity can occur if the nozzle orifice has an irregular, non-circular shape. Thus, such a nozzle plate should ensure that the ink droplet exiting the channel opening will travel along the predetermined trajectory with the predetermined volume and velocity so that the droplet lands on the receiver at the predetermined location and produces a pixel of predetermined size. To accomplish this result, each orifice is preferably precisely dimensioned so that each ink droplet exiting any of orifices travels along the predetermined trajectory with predetermined volume and velocity. This is important in order to avoid image artifacts, such as banding. Therefore, the technique used to make the nozzle plate should produce nozzle plate orifices that are precisely dimensioned and located to avoid such undesirable image artifacts.

Such a nozzle plate may be formed by a “negative relief” electroplating patterning process. In this process, a mandrel is formed by overcoating a substrate (e.g., silicon oxide or other nonconductive material) with a conductive film (e.g., chromium or nickel). A photoresist layer is then applied to the conductive film, which photoresist layer may be formed of sensitized resins or other suitable material. The photoresist layer is imaged and developed to expose selected areas of the conductive film. These selected exposed areas of conductive film are removed by exposing the film to an etchant, thereby leaving a relief pattern to complete formation of the previously mentioned mandrel. Such an etchant may be sodium hydroxide and potassium iron cyanate. Typically, the selected areas removed from the conductive film are circular holes, each hole corresponding to one of the nozzle orifices.

The nozzle plate itself may be formed by using the mandrel in combination with an electroplating process. In this regard, a layer of metal is electroplated over the conductive film and initially covers only the conductive film. Thereafter, the metal layer develops a growth front that closes over the circular holes where the conductive film was removed. The orifice diameter is defined by the edge of the growth front of the metal layer on the substrate. Thus, nozzle orifice diameter is determined by controlling the electroplating time. Alternatively, nozzle plates may be formed by an electroforming process using a mandrel having a “positive relief” pattern, such as caused by nonconductive disks on the conductive surface of the substrate, rather than the “negative relief” pattern mentioned hereinabove.

However, use of either the “positive relief” electroplating process or the “negative relief” electroforming process has various problems associated with it. A problem associated with each of these processes is variability of diameter of nozzle orifices. This may be due to the growth rate of the metal layer varying at different areas of the mandrel in the electroplating process (or electroforming process). Such variability in growth rate of the metal layer results in variability in diameter of the orifices, which diameter is defined by the previously mentioned growth front of the metal layer. Even relatively slight variability in growth rate of the metal layer in the electroplating (or electroforming) process can result in large relative error in orifice diameter. This problem is particularly severe when the techniques hereinabove are used to produce nozzle plates having small diameters which may be on the order of 10 $\mu$m to 30 $\mu$m. Thus, a problem in the art is variability in orifice diameter during manufacture of the nozzle plate.

Still another problem in the art is variability in nozzle orifice shape. That is, the prior art techniques mentioned hereinabove may sometimes produce noncircular orifices. This is undesirable because variability in orifice shape may also produce the previously mentioned image artifacts, such as banding. Such variability in orifice shape also may be due to uneven advancement of the metal layer growth front.

Yet another problem in the art is that some orifices may be formed completely closed. Of course, this is undesirable because completely closed orifices will produce the previously mentioned image artifacts, such as banding. Completely closed orifices may be due to completely uncontrolled advancement of the metal layer growth front.

Each of the problems identified hereinabove increases fabrication costs because each problem leads to rejection of nozzle plates as unusable. Hence, it is desirable to provide a nozzle plate having orifices of predetermined diameter and pitch in order to produce ink droplets of predetermined trajectory, volume and velocity.

Therefore, what is needed is a mandrel for forming an ink jet nozzle plate having orifices of precise size and location, and method of making the mandrel.

SUMMARY OF THE INVENTION

An object of the present invention is to provide a mandrel for forming an ink jet nozzle plate having orifices of precise size and location, and method of making the mandrel.

With the above object in view, the invention resides in a method of making a nozzle plate, comprising the steps of providing a substrate; depositing a film on the substrate; forming a well extending through the film and into the substrate, the well having an upright column of predetermined width integrally attached to the substrate; and depositing a nozzle plate material on the film and into the well until a layer of the material defines an orifice having a width defined by the width of the column.

According to a method of the invention, a nozzle plate mandrel is formed by overcoating a substrate with a metal film. The film is covered with a photoresist material. Selected circular portions of the photoresist are exposed to light passing through a photomask having annular light-transparent regions, of precise diameters and pitch. The photoresist is subjected to a developer bath which dissolves the photoresist exposed to the light, thereby revealing selected portion of the film. Next, an etchant is brought into contact with the film for etching-away portions of the film not covered by photoresist material. This etching process provides an annular opening in the film defining a region of precise diameter at the center of each opening. A second etching step is performed to create an annular recess extending into the substrate. The column resides at the center of the recess. Next, a new photoresist layer is then applied to the film. Selected portions of the new photoresist layer are exposed to light passing through a second photomask. The second photomask is aligned to the annular features on the substrate, such that circular regions are exposed directly over the columns in the substrate. The new photoresist material is then subjected to the developer which dissolves the new photoresist material to reveal portions of the film beneath the photoresist and selected areas of the substrate, specifically the metal film-covered columns. Following this step, the substrate is again placed in an etchant to remove the exposed portions of the metal film. After removing the remaining photoresist from the substrate, a metal layer that will form the nozzle plate is deposited onto the film and grows into the recess to substantially fill the recess, except for the space occupied by the column. The finished nozzle plate is separated from the film/substrate structure. The nozzle plate has orifices with precise diameters and pitch.

An advantage of the present invention is that the mandrel is reusable.

Another advantage of the present invention is that manufacturing errors are reduced.

Yet another advantage of the present invention, is that use thereof avoids missing (i.e., closed) nozzle orifices.

These and other objects, features and advantages of the present invention will become apparent to those skilled in the art upon a reading of the following detailed description when taken in conjunction with the drawings wherein there are shown and described illustrative embodiments of the invention.

BRIEF DESCRIPTION OF THE DRAWINGS

While the specification concludes with claims particularly pointing-out and distinctly claiming the subject matter of the present invention, it is believed the invention will be better understood from the following detailed description when taken in conjunction with the accompanying drawings wherein:

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
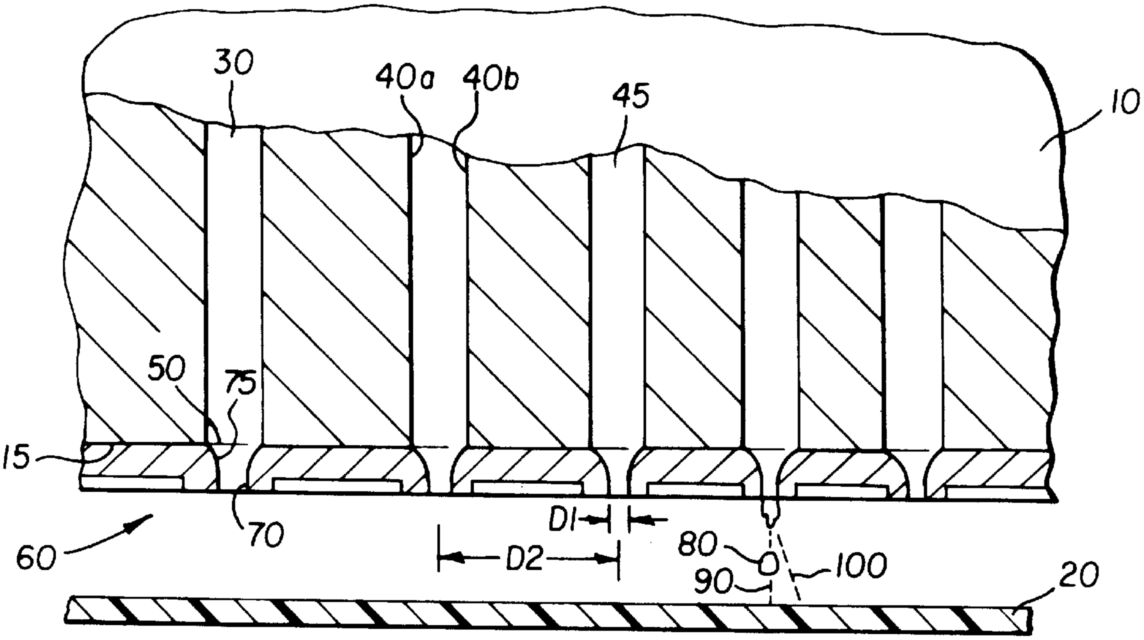
FIG. 1 is a view in partial elevation of a print head having a nozzle plate attached thereto, the nozzle plate having orifices therethrough of predetermined diameter and pitch.
Figure 2A:
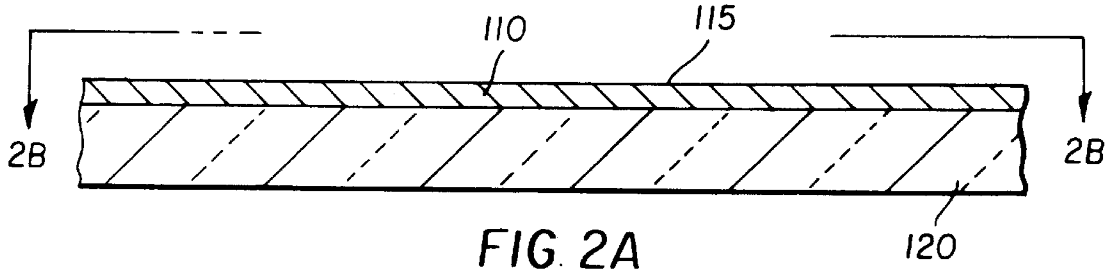
FIG. 2A is a view in elevation of a non-conductive substrate covered by a metallic film.
Figure 2B:
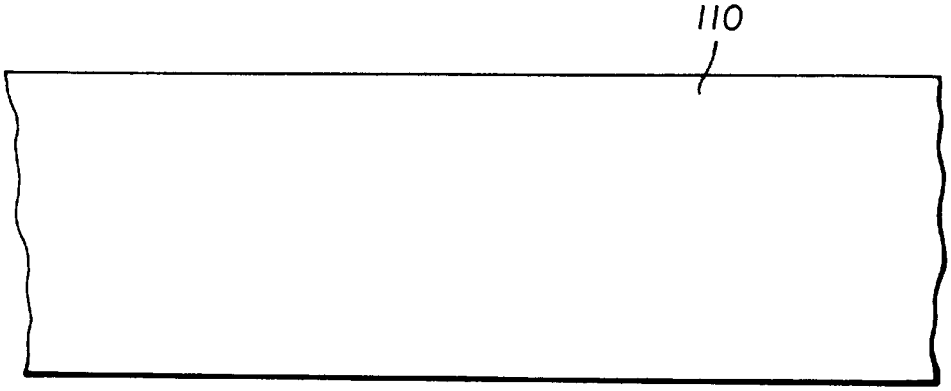
FIG. 2B is a view taken along section line 2B—2B of FIG. 2A.
Figure 3A:
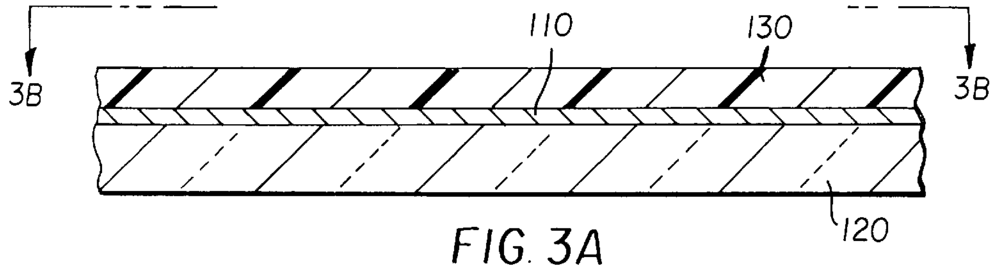
FIG. 3A is a view in elevation of the substrate and metallic film with a photoresist layer overlaying the film.
Figure 3B:
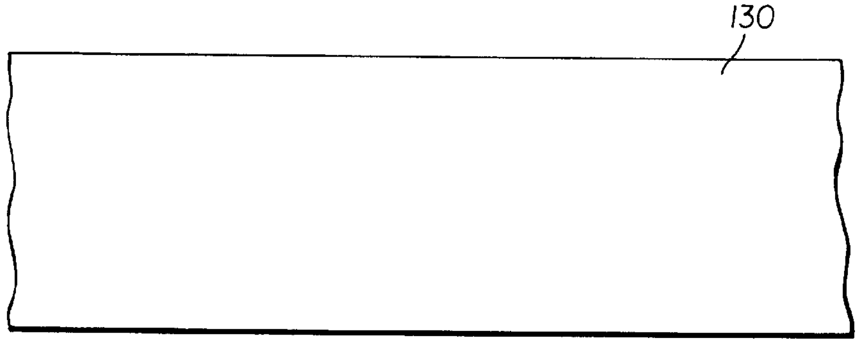
FIG. 3B is a view taken along section line 3B—3B of FIG. 3A.

Therefore, referring to FIG. 1, there is shown a print head portion 10 for printing an image (not shown) on a receiver 20, which may be a reflective-type receiver (e.g., paper) or a transmissive-type receiver (e.g., transparency). Print head portion 10 has a surface 15 thereon. Formed in print head portion 10 are a plurality of spaced-apart parallel ink channels 30 (only five of which are shown), each channel 30 being defined by oppositely disposed sidewalls 40*a* and 40*b*. Each channel terminates in a channel outlet 50 opening onto surface 15, channel outlet 50 preferably being of generally circular shape. Attached to surface 15, such as by a suitable adhesive, and extending along surface 15 is a nozzle plate, generally referred to as 60. Nozzle plate 60 includes a plurality of nozzle orifices 70 therethrough centrally aligned with respective ones of channel outlets 50. According to the invention, each orifice 70 obtains a precisely dimensioned diameter D1 and all orifices 70 are arranged to obtain a precise constant pitch D2. The terminology "pitch" is defined herein to mean the center-to-center distance between adjacent orifices 70. In addition, each orifice 70 has a funnel-shaped discharge throat 75 diverging almost immediately from a rear side of nozzle plate 60 toward a front side of nozzle plate 60. It is important that each orifice 70 has a funnel-shaped discharge throat 75. This is important because such a divergent funnel shape advantageously provides a sharp "pinch point" for droplet 80 so that droplet 80 accurately and consistently forms when droplet 80 is discharged through throat 75.

Referring again to FIG. 1, print head portion 10 is formed of a piezoelectric material, such as lead zirconate titanate (PZT). The piezoelectric material possesses piezoelectric properties so that an electric field (not shown) applied to a selected pair of sidewalls 40*a*/*b* produces a mechanical stress in the material. This pair of sidewalls 40*a*/*b* inwardly deform as the mechanical stress is produced by the applied electric field. As pair of sidewalls 40*a*/*b* inwardly deform, an ink droplet 80 is squeezed from the channel by way of orifice 70. However, it is desirable that ink droplet 80 exiting orifice 70 travel in a predetermined intended trajectory 90, so that droplet 80 lands on receiver 20 at a predetermined location. Thus, nozzle plate 60 is provided to ensure that droplet 80 exiting orifice 70 will travel along predetermined trajectory 90 rather than along an unintended trajectory 100. Also, nozzle plate 60 ensures that droplet 80 obtains a predetermined volume so that droplet 80 produces a pixel of predetermined size and also ensures that droplet 80 obtains a predetermined velocity. It has been found that orifice diameter D1 affect droplet trajectory, volume and velocity. As described in detail hereinbelow, nozzle plate 60 is fabricated by means of a mandrel produced by a photolithography process, such that nozzle plate 60 has orifices 70 of precise diameter D1 and pitch D2.

Therefore, referring to FIGS. 2A, 2B, 3A and 3B, a conductive film 110 (e.g., chromium, nickel, or other material suitable for plating and patterning) is deposited onto a nonconductive substrate 120 (e.g., glass or other dielectric material) in a continuous layer of uniform thickness. By way of example only, and not by way of limitation, thickness of film 110 may be approximately 1000 Å(angstroms) or more. Conductive film 110 has a top face 115. A light-sensitive photoresist layer 130 is deposited over the top of film 110 in a continuous layer of uniform thickness. Although thickness of photoresist layer 130 is not critical, it is nonetheless desirable that photoresist layer 130 have a uniform thickness. This uniform thickness should not vary from mandrel to mandrel that is manufactured. By way of example only, and not by way of limitation, photoresist layer 130 may be approximately 0.5 to 2.0 microns thick.

Figure 4A:
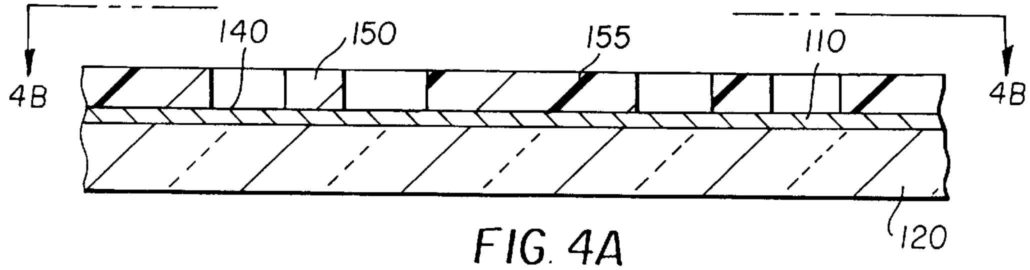
FIG. 4A is a view in elevation of the substrate, metallic film and photoresist layer after having been subjected to light passing through a first photomask and after a developer bath has dissolved selected portions of the photoresist layer to define an annular area and a column at the center of the annular area.
Figure 4B:
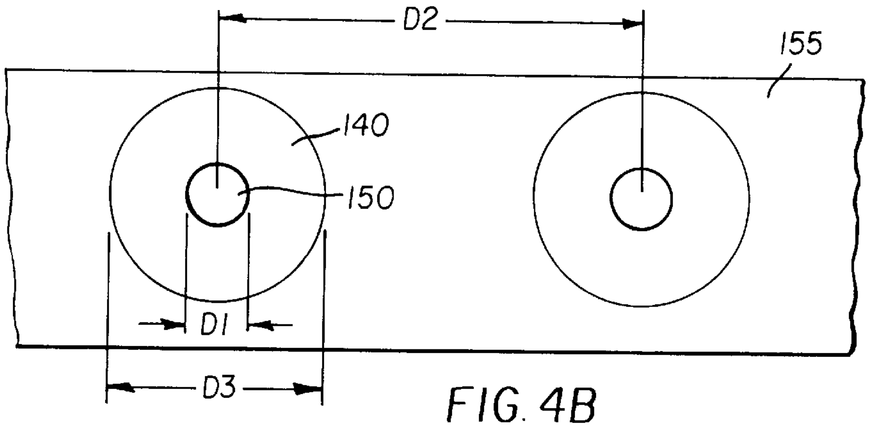
FIG. 4B is a view taken along section line 4B—4B of FIG. 4A.
Figure 5A:
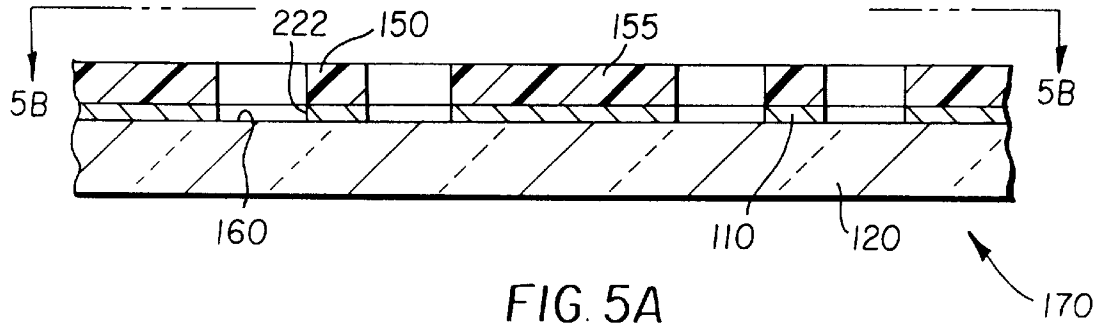
FIG. 5A is a view in elevation of the substrate, metallic film and photoresist layer after having been subjected to the light and developer bath and after having been etched to reveal selected areas of the substrate.
Figure 5B:
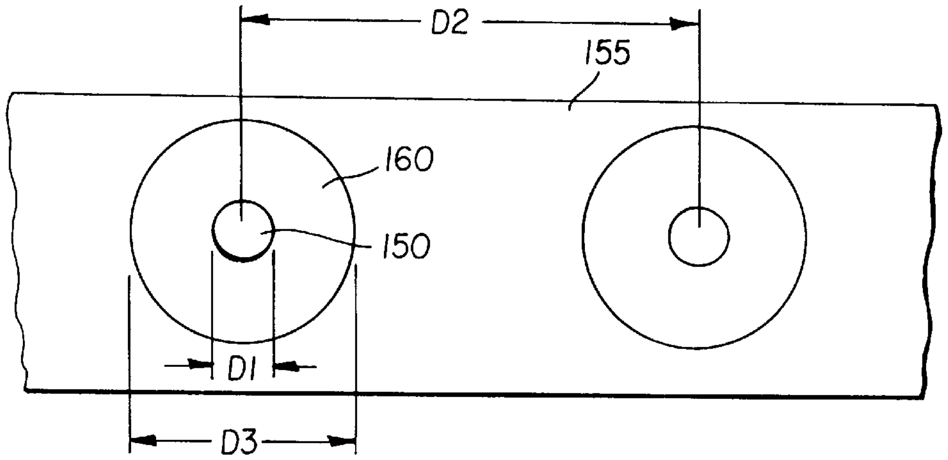
FIG. 5B is a view taken along section line 5B—5B of FIG. 5A.
Figure 6A:
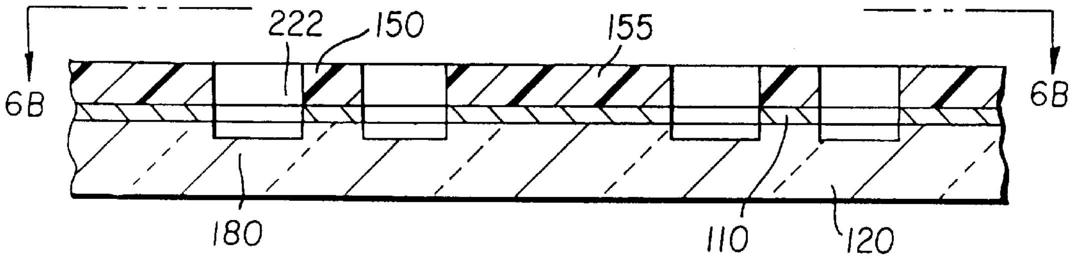
FIG. 6A is a view in elevation of the substrate, metallic film and photoresist layer after the selected areas of the substrate have been etched to a predetermined depth to define a recess in the substrate.
Figure 6B:
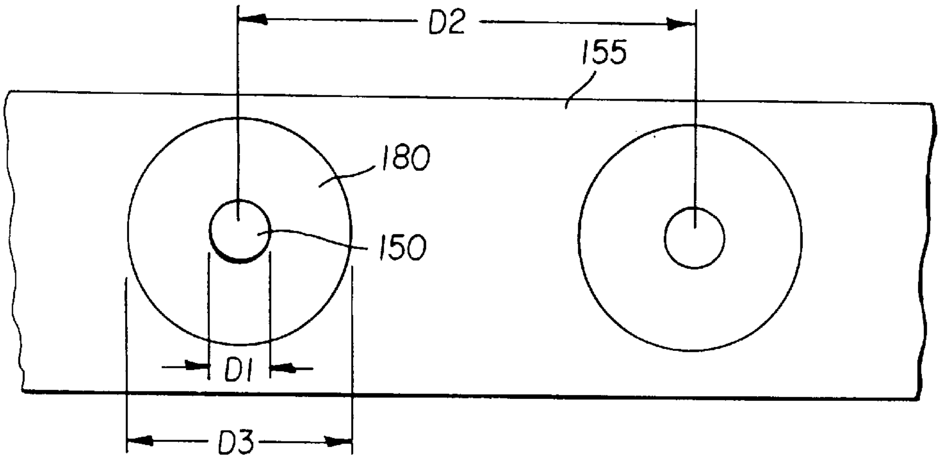
FIG. 6B is a view taken along section line 6B—6B of FIG. 6A.
Figure 6C:
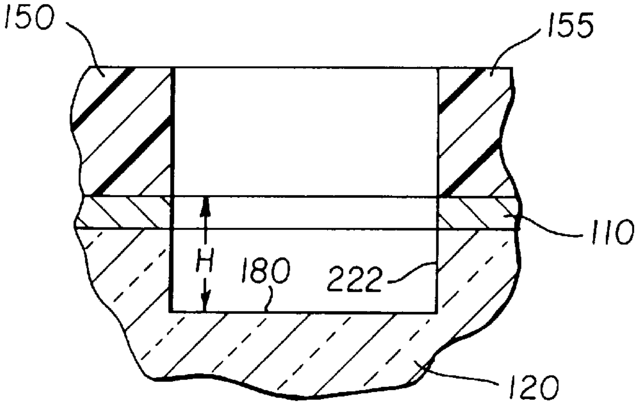
FIG. 6C is an enlarged fragmentation view of the recess etched in the substrate.
Figure 7A:
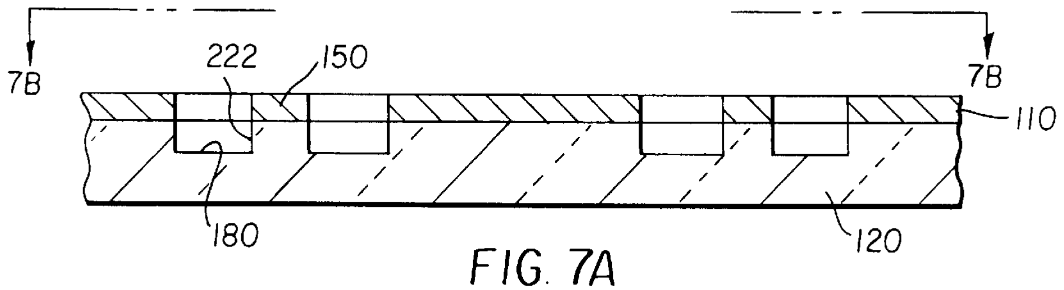
FIG. 7A is a view in elevation of the substrate and metallic film after the photoresist layer has been dissolved.
Figure 7B:
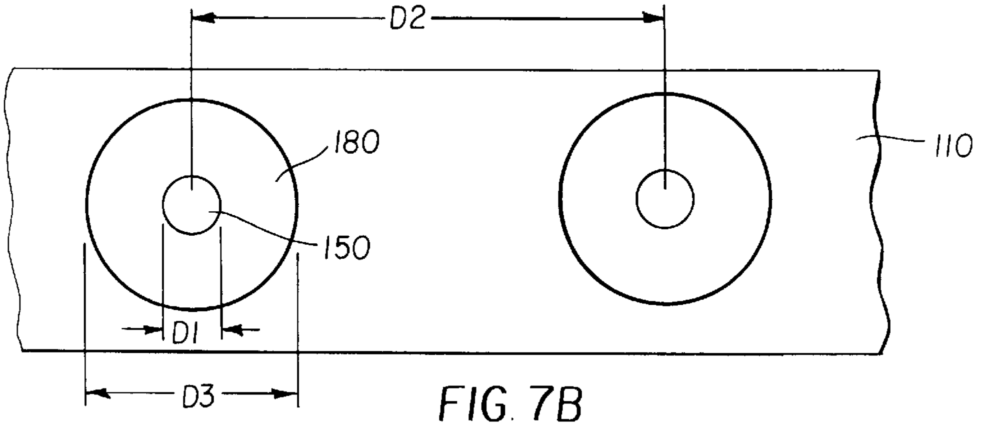
FIG. 7B is a view taken along section line 7B—7B of FIG. 7A.
Figure 8A:
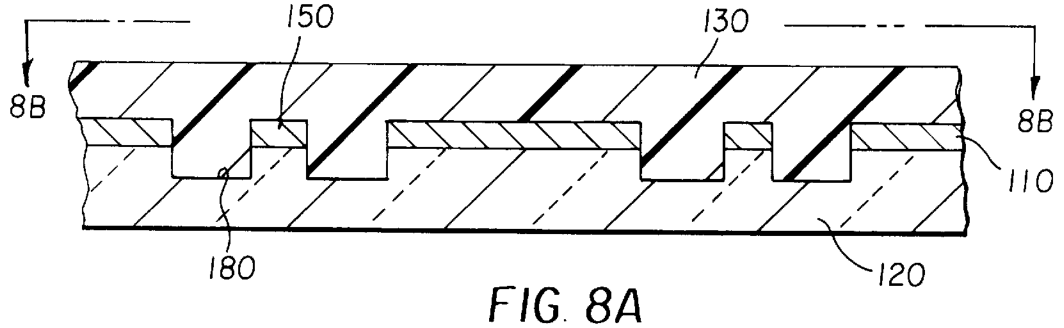
FIG. 8A is a view in elevation of a new photoresist layer applied the structure defined by the substrate and metallic film.
Figure 8B:
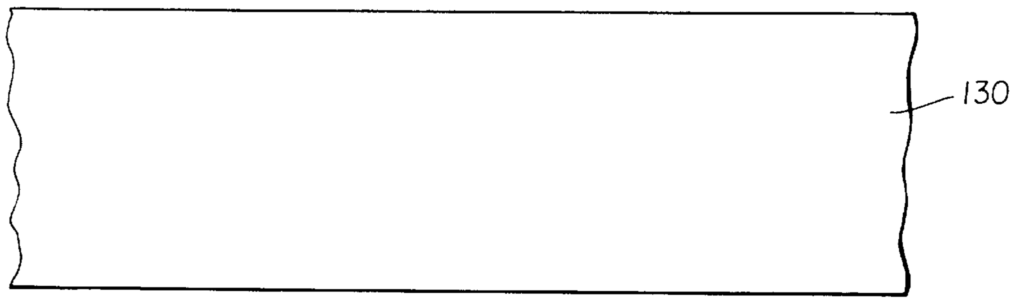
FIG. 8B is a view taken along section line 8B—8B of FIG. 8A.
Figure 9A:
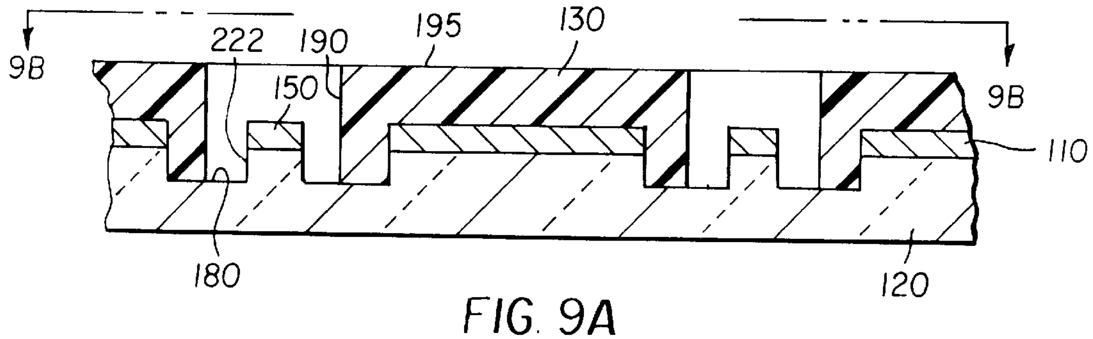
FIG. 9A is a view in elevation of the new photoresist layer, substrate and metallic film after selected portions of the new photoresist layer have been subjected to light passing through a second photomask and after having been exposed to a developer bath to dissolve selected portions of the photoresist layer.
Figure 9B:
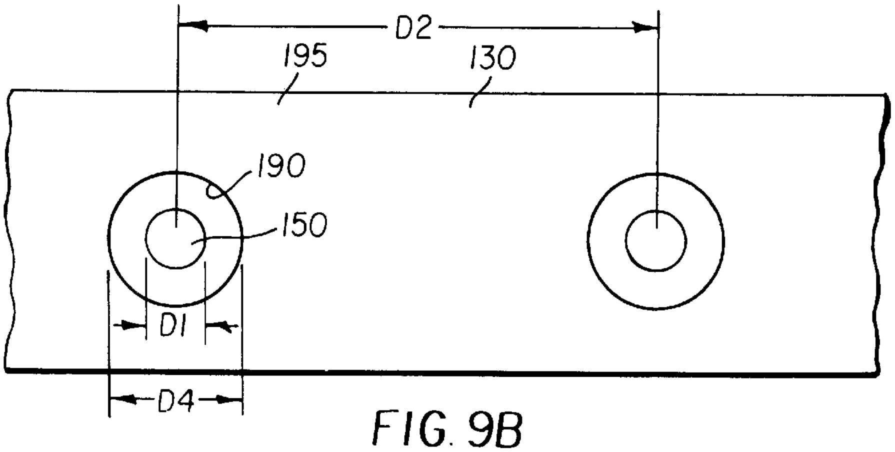
FIG. 9B is a view taken along section line 9B—9B of FIG. 9A.
Figure 10A:
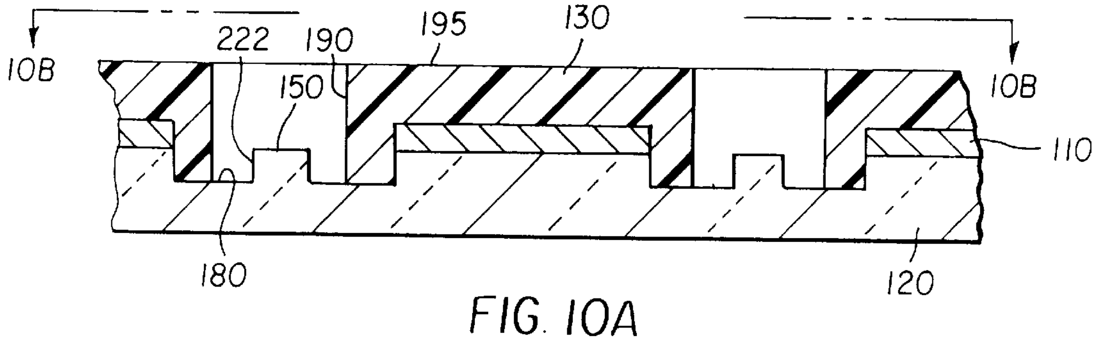
FIG. 10A is a view in elevation of the new photoresist layer, metal film and substrate, the metal film having been etched from the top of the column.
Figure 10B:
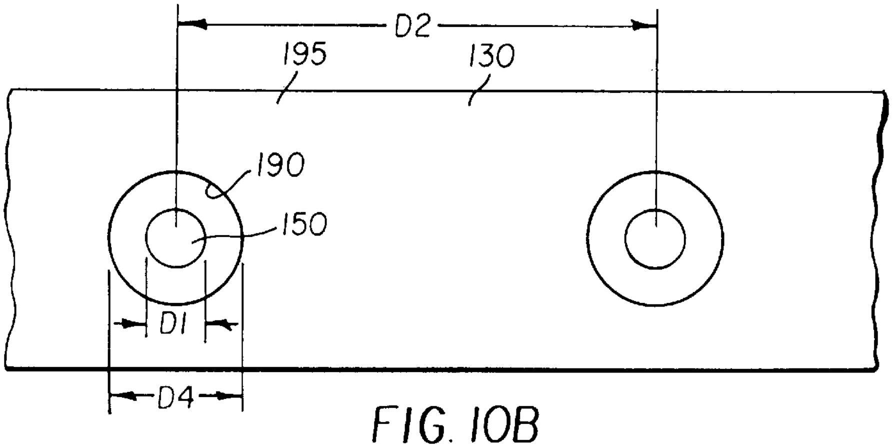
FIG. 10B is a view taken along section line 10B—10B of FIG. 10A.
Figure 11A:
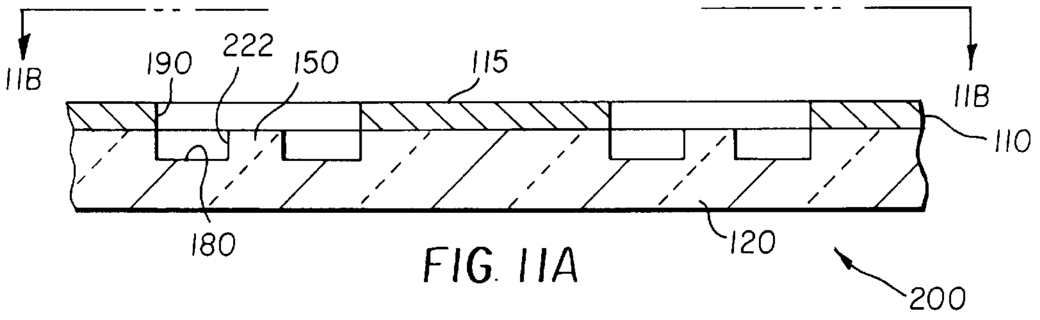
FIG. 11A is a view in elevation of the film and substrate, the film and substrate now forming a mandrel on which the nozzle plate is to be formed.
Figure 11B:
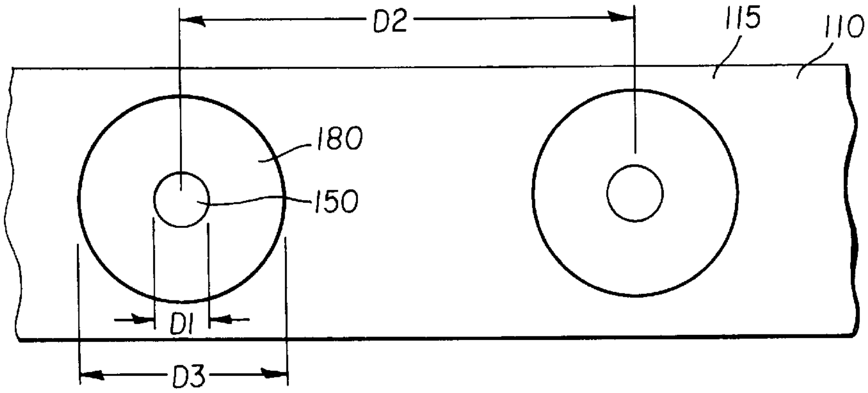
FIG. 11B is a view taken along section line 11B—11B of FIG. 11A.
Figure 11C:
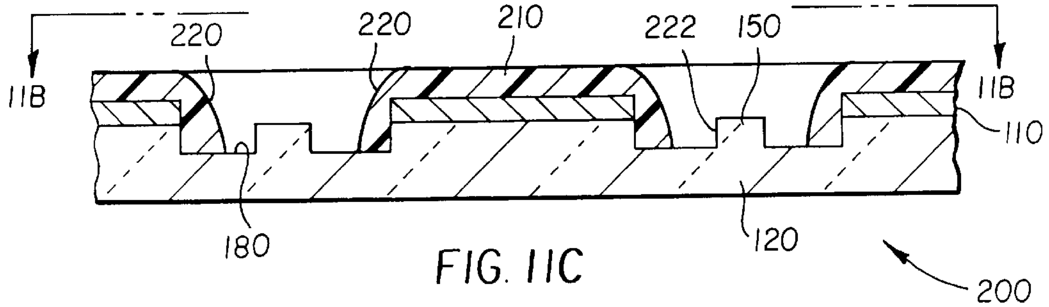
FIG. 11C is a view in elevation of the film and substrate showing metal being electrodeposited onto the film.
Figure 12A:
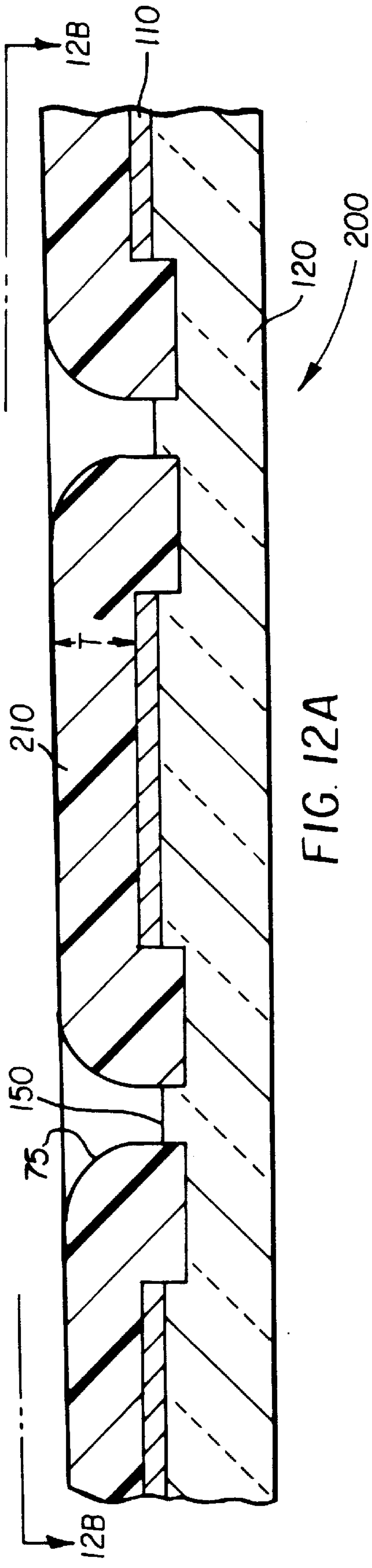
FIG. 12A is a view in elevation of the metal having been electrodeposited onto the film, except for the space occupied by the column, so as to form the nozzle plate.
Figure 12B:
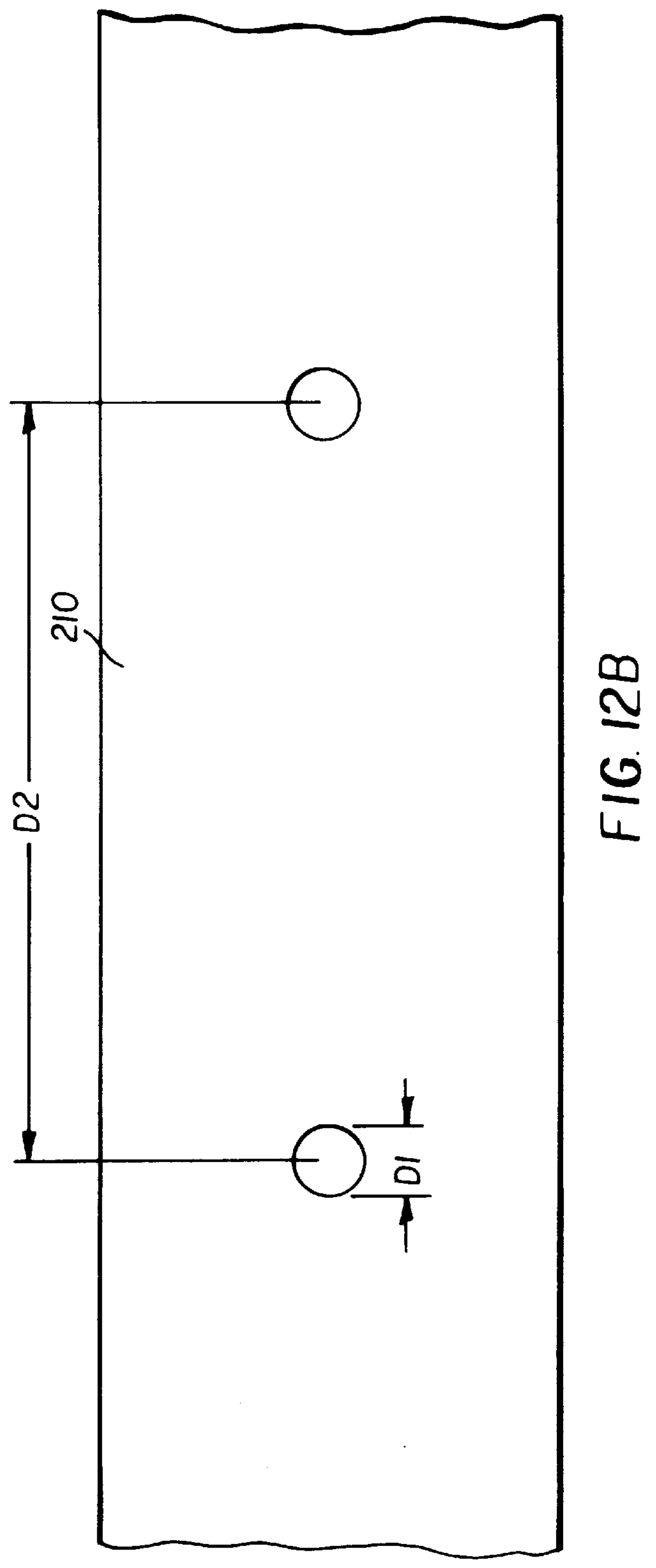
FIG. 12B is a view taken along section line 12B—12B of FIG. 12A.

Referring to FIGS. 4A and 4B, a first photomask (not shown) is disposed above photoresist layer 130. The photomask has a plurality of light-transparent annular regions, the regions having a predetermined diameter D1 and pitch D2. Of course, other areas of the photomask not including these regions having diameters D1 are opaque to light. A light source is disposed above the photomask and directs light through the transparent annular regions formed in the photomask. However, no light shines through a centermost circular portion of each region because the centermost portion is opaque. This centermost portion of the first photomask has diameter D1. As the light passes through each transparent annular region of the photomask, the light causes a chemical reaction in photoresist layer 130. The areas undergoing the chemical reaction become soluble in a developer. In this regard, a developer bath is preferably used to dissolve the areas of photoresist layer 130 that underwent the chemical reaction. A developer suitable for this purpose is tetrametylammonium hydroxide (TMAH). As the areas of photoresist layer 130 are dissolved by the developer, corresponding selected annular areas 140 (only two of which are shown) are defined on film 110. Centered in each annular area 140 is a circular column 150 of residual photoresist material. Column 150, which has diameter D1, is caused to be present because no light shines through the opaque centermost portion of the annular regions of the photomask. This step in the process creates a "patterned" photoresist layer 155. Film 110, substrate 120, and patterned photoresist layer 155 now define a sandwiched structure, generally referred to as 170.

Referring to FIGS. 5A, 5B, 6A, 6Band 6C, an etchant is used to etch an annular trough 160 in film 110. It may appreciated that this etchant may be a wet or dry etchant. Sandwiched structure 170 is preferably placed in a bath containing etchant, which chemically reacts with exposed portions of film 110 and does not react with substrate 120 or patterned photoresist layer 155. Etchant suitable for this purpose is sodium hydroxide and potassium iron cyanate. Next, substrate 120 is anisotropically etched to reveal an annular recess 180. In this regard, sandwiched structure 170 is preferably placed in a reactive ion etch chamber (not shown) to etch a predetermined depth "H" anisotropically into substrate 120, measured from the top face 115. Depth H is controlled such that depth H is uniform across surface of each recess 180 so that nozzle plate 60 will be appropriately formed. It may be appreciated with reference to the several figures that depth H is less than height of the film/substrate combination. By way of example only, and not by way of limitation, depth H may be approximately 1 to approximately 3 microns. Also, it may be appreciated from the teachings herein that patterned photoresist layer 155 and film 110 serve as a mask for etching substrate 120.

Referring to FIGS. 7A, 7B, 8A and 8B, patterned photoresist layer 155 is removed, such as by immersion in a solvent such as acetone, or by means of a plasma ash. This step in the process reveals film 110, including that portion of film 110 resting atop column 150.

Referring to FIGS. 9A, 9B, 10A, 10B, 11A and 11B, a new photoresist layer 130 is then applied to film 110. Next, the new photoresist layer 130 is exposed to light passing through a light-transparent circular portion of a second photomask (not shown). The light exposes and chemically reacts with a preselected portion of the photoresist material. The photoresist material is then subjected to the developer which dissolves the exposed portion of the photoresist material. As the preselected portion of the photoresist material dissolves, a circular well 190 is formed. Well 190 extends from a top surface 195 of photoresist layer 130 to recess 180 in substrate 120 and surrounds column 150. Moreover, circular well 190 has a diameter D4 greater than diameter D1 but less than diameter D3. By the design of the openings in this photomask, it is possible, therefore to allow an alignment tolerance of several microns or more in this patterning step. The second photomask must be aligned relative to substrate 120 to create by exposure and development opening 190 which coincides with column 150, but which does not coincide with diameter D3 of circular well 180. Next, film 110 that resides atop column 150 is removed by means of chemical etching. An etchant suitable for this purpose is sodium hydroxide and iron cyanate. It may be appreciated that film 110 on column 150 is removed in this manner to prevent the electroplated layer from growing over column 150 when it contacts the edge of column 50. Photoresist layer 130 is then removed by application of a solvent such as acetone. Completion of this step in the process obtains a mandrel, generally referred to as 200, upon which nozzle plate 60 is formed, as described in detail presently.

Referring now to FIGS. 11A, 11B, 11C, 12A and 12B, nozzle plate 60 if formed by gradual electrodeposition of a metal layer 210 on top face 115 of film 110. In the preferred embodiment of the present invention, metal layer 210 is nickel. Metal layer 210 first covers top face 115. As metal layer 210 thickens, a growth front 220 forms and metal layer 210 grows over sidewalls of well 190, eventually forming a funnel shape in transverse cross section and converging toward a vertical side-flank 222 of column 150. This electrodeposition step is terminated when growth front 220 comes into contact with side-flank 222. At this point, nozzle plate 70 has a thickness "T" . The fact that column 150 stops growth front 220 from converging any further once growth front 220 contacts side-flank 222 allows the electrodeposition step to be carried-out for a slightly longer time than that of the prior art, without any of the resulting nozzle diameters D1 being smaller than desired. In this manner, diameter D1 is precisely and consistently formed for each nozzle orifice 70 belonging to each individual nozzle plate 60 made by means of mandrel 200. In addition, due to shape of growth front 220, discharge throat 75 advantageously provides a sharp "pinch point" for droplet 80 so that droplet 80 accurately and consistently forms when droplet 80 is discharged through throat 75.

Figures 13A, 13B, 13C:
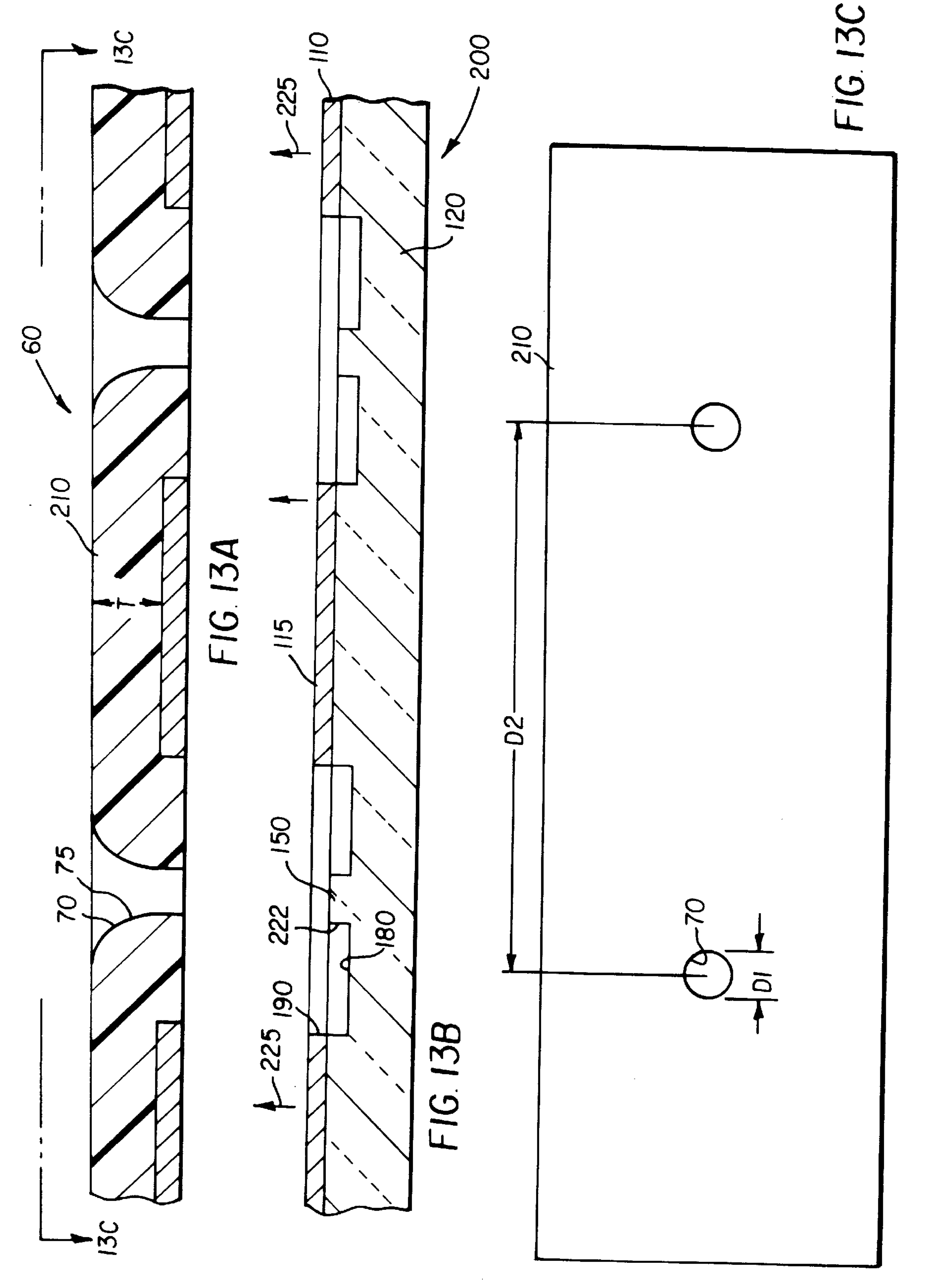
FIG. 13A is a view in elevation of the nozzle plate having been separated from the mandrel.
FIG. 13B is a view in elevation of the mandrel after the nozzle plate has been separated therefrom.
FIG. 13C is a view taken along section line 13C—13C of FIG. 13A.
Figure 14A:
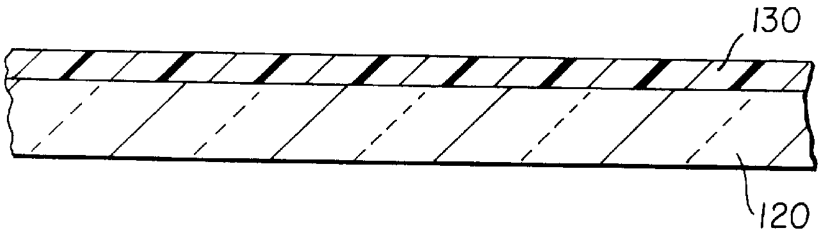
FIG. 14A is a view in elevation of a first step in forming an alternative embodiment of the mandrel.
Figure 14B:
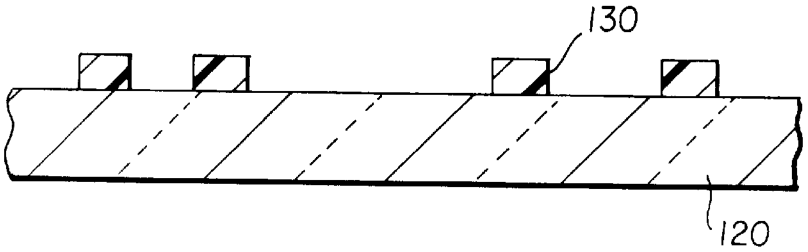
FIG. 14B is a view in elevation of a first intermediate step in the formation of the mandrel.
Figure 14C:
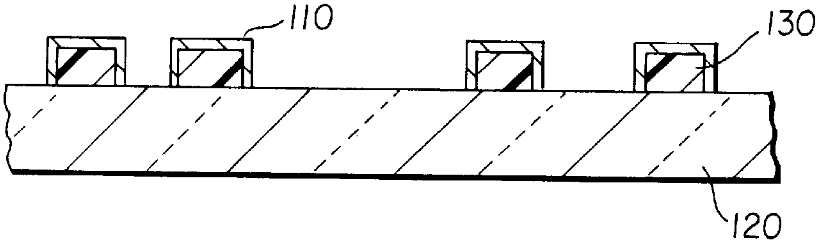
FIG. 14C is a view in elevation of a second intermediate step in the formation of the mandrel.
Figure 14D:
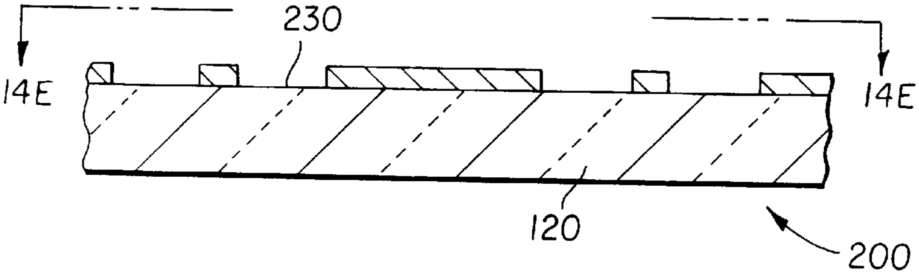
FIG. 14D is a view in elevation of a third intermediate step in the formation of the mandrel.
Figure 14E:
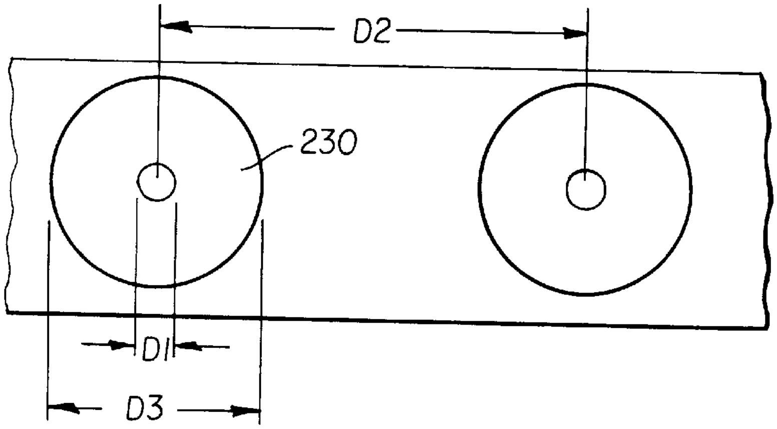
FIG. 14E is a view taken along section line 14E—14E of FIG. 14D.

As best seen in FIGS. 13A, 13B and 13C, nozzle plate 60 is separated from mandrel 200, such as by releasing (i.e., lifting or separating) nozzle plate 60 in direction of arrows 225. According to the invention, all orifices 70 now have precise diameters D1 and pitch D2. By way of example only, and not by way of limitation, diameter D1 may be 20 microns and nozzle plate 60 may be 25 microns thick, for example. These results present a distinct improvement over the prior art. For example, in the prior art a dielectric circle would need to be 80 microns in diameter, and the electroplating process would need to grow inwardly 30 microns from the wall of well 190 to create the nozzle plate of the invention. Without column 150, a 5% deviation in the growth rate of front 220 would result in a 3 micron deviation in nozzle diameter D1 from nozzle orifice to nozzle orifice of the same nozzle plate or among a plurality of nozzle plates. This 3 micron deviation would represent a 15% error in nozzle orifice diameter. In the case of the present invention, column 150 defines the nozzle orifice diameter. In this manner, nozzle orifice diameter D1 can be easily controlled to within 1 micron. Thus, column 150 only needs to block growth variability of 1.5 microns from the wall of well 190. By way of example only, and not by way of limitation, a 2 micron height for column 150 is sufficient for blocking growth front 220.

It has been discovered that diameter D3 of recess 180 is a function of diameter D1, depth H and thickness of the nozzle plate 60 as follows:

$$D3 \approx D1 + 2T + H \quad \text{Equation}$$

where,

D3≡diameter of recess 180;

D1≡diameter of nozzle orifice 70;

T≡thickness of nozzle plate 60; and

H≡depth of well 190.

Referring now to FIGS. 14*a*, 14B, 14C, 14D and 14E, there is shown an alternative method of forming mandrel 200. According to this alternative method, mandrel 200 is made by a "lift-off" process, rather than by the etching process described hereinabove. That is, positive photoresist layer 130 is deposited on substrate 120. Positive photoresist layer 130 is then exposed to light passing through the previously mentioned photomask. Next, with the photomask removed, photoresist layer 130 is subjected to an "image reversal" treatment, which renders all previously exposed photoresist insoluble to developer while all unexposed photoresist retains its photosensitivity. The techniques for performing image reversal are well known in the art and are not described herein. After image reversal, the entire photoresist layer 130 is "flood exposed" to the light source. Photoresist layer 130 is then developed by means of a suitable developer (e.g., TMAH). The developer dissolves-away only areas which were not initially exposed to light through the photomask. The pattern produced on glass substrate 120 results in an annular photoresist region 230 having desired inner diameter D1 and outer diameter D3. Of course, diameter D1 defines an area centrally located within annular region 230 where photoresist has been removed. A metal film 110 is then deposited, such as by thermal evaporation, on the substrate 120 and photoresist layer 130. The photoresist layer 130 and the portions of metal film 110, which cover the photoresist, are then removed, such as by application of a solvent (e.g., acetone). This step exposes areas of glass substrate 10 such that annular region 230 of substrate 10 has well-defined sharp-edged boundaries. The processes forward to complete creation of the mandrel and the electroformed nozzle plate are identical to those previously described with the exception that in this embodiment, only metal film 110 provides the mask during the reactive ion etching into substrate 120. In other words, no photoresist remains in substrate 10 at the point when the reactive ion etching is taking place.

An advantage of the present invention is that mandrel 200 is reusable. This is so because recess 180 is permanently etched into substrate 120 and conductive film 110 remains on substrate 120. Therefore, no further processing is necessary to reuse mandrel 200 in order to produce more nozzle plates 60, with the exception of a cleaning step prior to reuse.

Another advantage of the present invention is that manufacturing errors are reduced. This is so because the process of the invention uses photolithographically-defined column 150 which allows a more precise control of growth front 220 compared to prior art electroplating processes, which rely solely on control of the electroplating time and conditions. Use of the photolithographically-defined column 150 allows relaxation of control over the plating process for making nozzle orifices 70 having uniform diameters D1.

Still another advantage of the present invention is that only a single photomask need be used rather than a plurality of photomasks to define the annular areas 140 and columns 150. That is, diameter D1 and diameter D3 are formed with use of single photomask, eliminating need to align column 150 within annular areas 140. Not only does this save time in the mandrel fabrication step; it also insures that column 150 will be centered within annular areas 140. Especially in the case of fabricating small diameter nozzles orifices 70, a misregistration of column 150 within annular area 140 of even 1 micron will produce non-symmetrical nozzles. The second photomask used in the process of the invention serves only to uncover photoresist from column 150, allowing metal film 110 on column 150 to be removed. By design of this process, the alignment of the second photomask is very relaxed compared to the required alignment accuracy of annular areas 140 and columns 150, as explained previously.

Yet another advantage of the present invention is that use thereof avoids missing (i.e., closed) nozzle orifices 70. That is, the prior art electroforming processes which do not include columns 150 can produce missing nozzle orifices. This occurs because of non-uniformities in the electroplating process which allow growth fronts 220 to grow into each other. This problem is particularly severe when forming nozzle plates having nozzle orifices of relatively small diameter. The present invention eliminates this type of manufacturing failure.

While the invention has been described with particular reference to its preferred embodiments, it will be understood by those skilled in the art that various changes may be made and equivalents may be substituted for elements of the preferred embodiments without departing from the invention. For example, substrate 120 may be a conductive material rather than a nonconductive material in the case when the conductive material is overcoated with a nonconductive film that is thicker than "H".

Therefore, what is provided is a mandrel for forming an ink jet nozzle plate having orifices of precise size and location, and method of making the mandrel.

PARTS LIST

D1 . . . nozzle orifice diameter
D2 . . . pitch (of nozzle orifices)
D3 . . . recess diameter
D4 . . . diameter of well
T . . . thickness of nozzle plate
10 . . . print head
15 . . . surface
20 . . . receiver
30 . . . ink channel
40*a*/*b* . . . sidewalls
50 . . . channel outlet
60 . . . nozzle plate
70 . . . nozzle orifices
75 . . . discharge throat
80 . . . ink droplet
90 . . . intended trajectory
100 . . . unintended trajectory
110 . . . conductive film
115 . . . .top face
120 . . . non-conductive substrate
130 . . . photoresist layer
140 . . . annular areas
150 . . . column
155 . . . patterned photoresist layer
160 . . . trough
170 . . . sandwiched structure
180 . . . recess
190 . . . well
195 . . . top surface
200 . . . mandrel
210 . . . metal layer
220 . . . growth front
222 . . . side-flank
225 . . . arrows
230 . . . photoresist region

What is claimed is:

1. A method of making a nozzle plate, comprising the steps of:

(a) providing a substrate;

(b) depositing a film on the substrate, wherein said substrate and said film define a first height;

(c) forming a well extending through the film and into the substrate, the well having an upright column therein of predetermined width integrally attached to the substrate, wherein said column defines a second height less than the first height; and (d) depositing a nozzle plate material on the film and into the well until a layer of the material defines an orifice having a width defined by the width of the column.

2. The method of claim 1, wherein the step of depositing the material comprises the step of depositing the material until a grovth front of the material contacts the column, whereupon the step of depositing the material is terminated so as to render the nozzle plate.

3. The method of claim 1, further comprising the step of releasing the material from the film and well.

4. A method of making a nozzle plate, comprising the steps of:

(a) providing a substrate;

(b) electrodepositing a film onto the substrate, wherein said substrate and said film define a first height;

(c) forming a plurality of annular wells extending through the film and into the substrate by etching the film and substrate, so as to define a plurality of annular recesses in the substrate and so as to define a plurality of adjacent wells each extending through the film and into the substrate, respective ones of the wells defining a upright column of predetermined diameter, each column having a side-flank and the plurality of columns having a predetermined pitch, wherein each of said columns define a second height less than the first height; and (d) electrodepositing a metal on the film and into the wells until a layer of the metal defines a plurality of adjacent orifices each having a diameter defined by the diameter of respective ones of the columns, so that each orifice obtains a predetermined diameter and so that the orifices obtain the predetermined pitch.

5. The method of claim 4, wherein the step of electrodepositing the metal comprises the step of electrodepositing the metal until a growth front of the metal contacts the side-flank, whereupon the step of electrodepositing the metal is terminated so as to form the nozzle plate having orifices of precise diameter and pitch.

6. The method of claim 4, wherein the step of electrodepositing the metal comprises the step of electrodepositing the metal until the growth front of the metal first contacts the side-flank so as to form the nozzle plate having funnel-shaped orifices of precise diameter and pitch.

7. The method of claim 4, further comprising the step of separating the metal from the film and well.

8. A mandrel for forming a nozzle plate, comprising:

(a) a substrate;

(b) a film disposed on said substrate, said substrate and said film defining a well extending through said film and into said substrate, wherein said film and said substrate define a first height; and (c) an upright column of predetermined width disposed in the well and integrally attached to said substrate, wherein said column defines a second height less than the first height.

9. A mandrel for forming an ink jet nozzle plate having a plurality of orifices of predetermined diameter and predetermined pitch, comprising:

(a) a substrate formed of a nonconductive material;

(b) a metal film disposed on said substrate, said substrate and said film defining a plurality of adjacent annular wells extending through said film and into said substrate; and (c) a plurality of upright columns of predetermined diameter centrally disposed in respective ones of the wells and integrally attached to said substrate, each of said columns having a side-flank, the plurality of columns having a predetermined pitch, wherein said film and said substrate define a first height and wherein each of said columns defines a second height less than the first height.

* * * * *